United States Patent [19]

Sowa et al.

[11] 4,224,991
[45] Sep. 30, 1980

[54] METHOD AND APPARATUS FOR EXTRACTING CRUDE OIL FROM PREVIOUSLY TAPPED DEPOSITS

[75] Inventors: Armin Sowa, Ottobrunn; German Munding, Bad Friedrichshall, both of Fed. Rep. of Germany

[73] Assignee: Messerschmitt-Bölkow-Blohm GmbH, Fed. Rep. of Germany

[21] Appl. No.: 16,072

[22] Filed: Feb. 28, 1979

[30] Foreign Application Priority Data

Mar. 1, 1978 [DE] Fed. Rep. of Germany ....... 2808690

[51] Int. Cl.³ ...................... E21B 36/02; E21B 43/24
[52] U.S. Cl. .................................. 166/272; 60/34.55; 60/39.58; 166/57
[58] Field of Search ................... 166/57, 63, 272, 302, 166/303; 60/39.55, 39.53, 39.58, 39.59

[56] References Cited

U.S. PATENT DOCUMENTS

| | | | |
|---|---|---|---|
| 2,183,313 | 12/1939 | Goddard | 60/39.58 X |
| 2,609,658 | 9/1952 | Goddard | 60/39.59 X |
| 2,734,578 | 2/1956 | Walter | 166/302 UX |
| 2,770,097 | 11/1956 | Walker | 60/39.58 X |
| 3,595,316 | 7/1971 | Myrick | 166/303 |
| 3,700,035 | 10/1972 | Lange | 166/272 X |
| 3,833,059 | 9/1974 | Sisson | 166/303 X |
| 3,980,137 | 9/1976 | Gray | 166/303 |
| 4,041,699 | 8/1977 | Schelp | 60/39.59 X |
| 4,156,421 | 5/1979 | Cradeur et al. | 166/303 X |
| 4,159,743 | 7/1979 | Rose et al. | 166/302 |

*Primary Examiner*—Stephen J. Novosad
*Assistant Examiner*—George A. Suchfield
*Attorney, Agent, or Firm*—McGlew and Tuttle

[57] ABSTRACT

A device for extracting crude oil out of an extraction bore of a previously tapped deposit, comprises, a combustion chamber having at least one reaction chamber portion and an evaporation chamber portion arranged in axial relationship with a constricted nozzle portion therebetween. Advantageously, an additional constricted nozzle portion separates a turbulence chamber from a front reaction chamber and the second constriction separates the front reaction chamber from a rear evaporation chamber. The evaporation chamber in turn feeds through a nozzle section to a narrow discharge into the extraction bore. A fuel and chemical oxygen or an oxygen carrier are directed into the combustion chamber preferably in front of the first constriction and forms high temperature combustion gases into which the water is directed in a manner to intermix the water with the combustion gases and to form superheated steam which is then discharged into the extraction bore. The steam causes the oil in the previously tapped deposit to become less viscous and to flow out of the extraction bore.

7 Claims, 3 Drawing Figures

METHOD AND APPARATUS FOR EXTRACTING CRUDE OIL FROM PREVIOUSLY TAPPED DEPOSITS

FIELD AND BACKGROUND OF THE INVENTION

This invention relates to crude oil extraction in general and, in particular, to a new and useful method and device for generating hot vapors for the tertiary extraction of crude oil, whereby, superheated steam is forced over a long period of time through feed bores into a deposit which had already been exploited in a primary and a secondary stage, so as to make the oil more liquid and to drive it in a direction of the extraction bore or bores.

DESCRIPTION OF THE PRIOR ART

This invention relates to oil extraction and in view of the fact that worldwide supplies of oil will be exhausted in the foreseeable future, a special problem in oil drilling is that only about 33% of the existing deposits can be technically exploited at the present time. By 1985, it is expected that this degree of oil extraction will have increased to about 36%. In view of the presently known deposits and the given oil consumption, an increase of the degree of oil extraction by 1% is equivalent to a worldwide oil consumption of one year. The importance of increasing the degree of oil extraction can thus be readily seen.

In order to force this factor, the so-called tertiary extraction technique has been in use for a long time, wherein large quantities of superheated steam are forced with a pressure of about 150 bar and a temperature of about 350° C. through several bores into deposits that had already been exploited in the primary and secondary state, so that the deposits are heated and the remaining viscous oil is made more liquid. We are speaking here of about 10 tons of steam over a period of several years. A special problem is naturally the generation of such large quantities of steam, which are produced by means of conventional stationary boilers, where the water is supplied by wells located in the vicinity.

SUMMARY OF THE INVENTION

The present invention provides a steam generator or hot gas generator with a high specific output which is particularly suitable for the present purpose. The device includes a combustion chamber operated with fuel, chemical oxygen or an oxygen carrier and water.

For carrying out the invention, water of ambient temperature and in the liquid state, and oxygen which has first been used to cool the wall of the combustion chamber or a part thereof are introduced tangentially into the combustion chamber head, while the fuel is injected centrally into the combustion chamber.

To this end, the combustion chamber has two constrictions or nozzle formations arranged in series in an axial direction, namely, a front constriction to form a front turbulence chamber in which a portion of the water of ambient temperature and the heated oxygen are introduced, and includes a central constriction dividing the combustion chamber proper into two continuous individual chambers to form a front reaction chamber and a rear evaporation chamber, into which the second portion of the water is injected, with the fuel being injected into the divergent region of the reaction chamber directly behind the front constriction.

The steam generation system, according to the invention, is furthermore characterized in that the device, and all of the auxiliary units necessary for its operation, are mobile. The mobility can be so conceived that the steam generating combustion chamber is installed on a vehicle and that one vehicle each is provided to load an oxygen tank and a water tank; one vehicle for receiving an electromotor and three pumps driven by the motor; namely, an oxygen pump, a water pump and a fuel pump, and that another vehicle serves to receive an internal combustion engine, an electric generator driven by the engine, and means for controlling the entire plant.

The suggested device is particularly suitable for the intended use by its extremely specific efficiency, since it provides the prerequisite for changing a steam-generating plant into a mobile plant. In the present case, only the mobility permits a trouble-free supply of the feed bores to the deposits to be heated, and which are located relatively far apart, with superheated steam, which must be done in a certain cycle. Heretofore, this was done by cumbersome and time-consuming assembly and disassembly of the stationary plant on the terrain which was hardly open to traffic, or by partially laying very long superheated steam pipes which resulted in great heat losses and expensive insulation work.

As disclosed in German Pat. No. 1,142,253, in rocket engines and gas turbine engines, it is known to inject fuel and oxygen into the combustion chamber in addition to the two propellant components in order to cool the combustion chamber and to reduce the temperature of the generated gases to make them thermally suitable for a following turbine.

Accordingly, an object of the invention is to provide a device for extracting crude oil from a previously tapped deposit through an extraction bore which comprises a combustion chamber having at least one reaction chamber portion and an evaporation chamber portion downstream of the reaction chamber portion separated by a constricted nozzle portion and which includes means for introducing a fuel and chemical oxygen or an oxygen carrier into the reaction chamber to form high temperature combustion gases and also for introducing water into the gases to form a superheated steam which is directed by the force of the gases into the deposit to cause the oil to become viscous and to flow out of the extraction bore.

A further object of the invention is to provide a method of extracting crude oil which comprises, reacting a fuel with a chemical or liquid oxygen or oxygen carrier in a combustion chamber in a manner such that the high temperature gases are formed and parted with a whirling high velocity and directing water into the gases thus formed to form superheated steam and directing the steam by the force of the gases into the oil deposit to cause the oil to become less viscous and to flow out the extraction bore.

Another object of the invention is to provide a device for extracting crude oil from previously tapped deposits which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
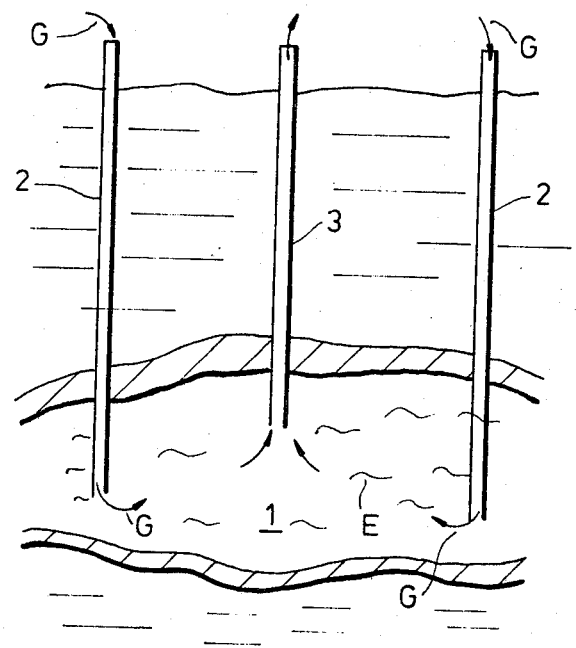
FIG. 1 is a schematic sectional view showing a geological formation with a crude oil deposit.

Referring to the drawings in particular, the invention embodied therein, comprises, a device for extracting crude oil from a previously tapped deposit 1, by supplying a hot gas or vapor G through one or more bores 2 into the deposit 1. Deposit 1 is of a type which has been tapped on several previous occasions in a primary and a secondary state. The addition of the hot vapors causes the heating of the crude oil E which is viscous by nature so that it becomes less viscous and more liquid and is expelled through one of the several bores 3 or it is pumped out from the latter.

Figure 2:
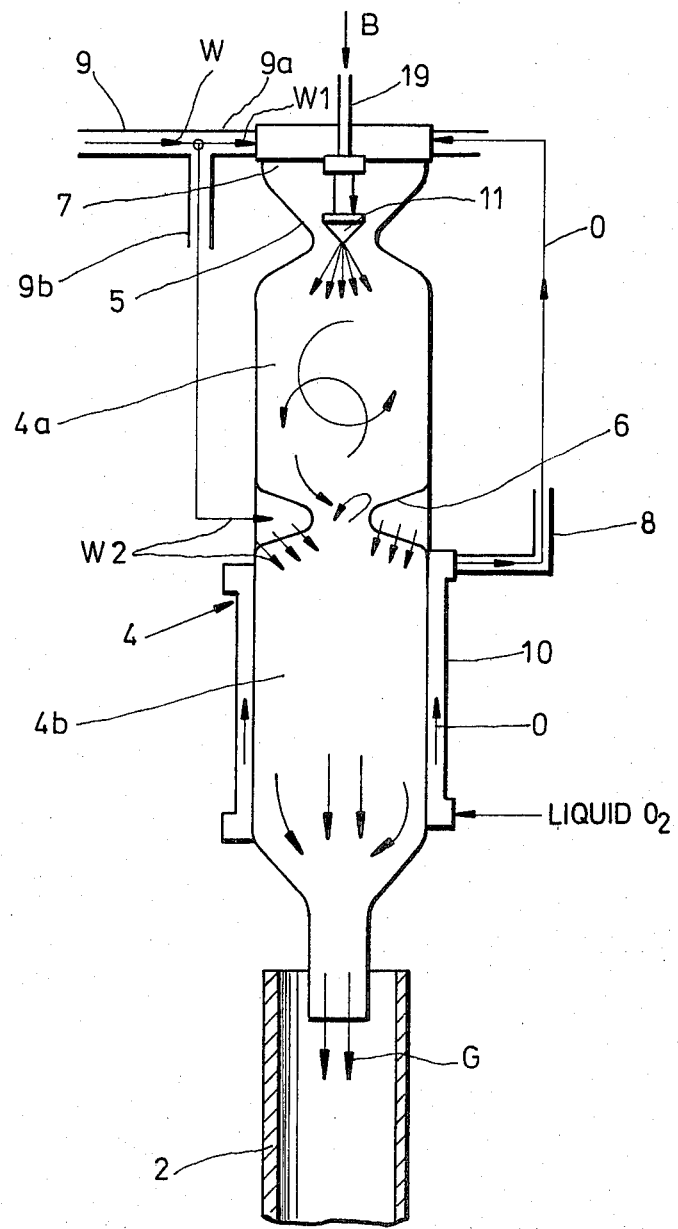
FIG. 2 is a longitudinal sectional view of an apparatus for generating vapors for extraction of crude oil in accordance with the invention.

As shown in FIG. 2, a combustion chamber 4, which has a front constriction 5 and a central constriction 6 serves to generate hot gas G. Front constriction 5 serves to form a turbulence chamber 7 in which oxygen (O) is introduced tangentially through a line 8. Furthermore, water W is supplied to combustion chamber 4 through a line 9. Only a portion W1 of water W is introduced through branch 9 into turbulence chamber 7.

The second constriction 6 divides combustion chamber 4 into a front reaction chamber 4a and into a rear evaporation chamber 4b, which has a cooling jacket 10 through which the liquid oxygen (O) is sent, which is thus heated. The other portion W2 of water W is injected through central constriction 6 into evaporation chamber 4b, and is fed through branch line 9b. Finely atomized diesel oil is also injected into reaction chamber 4a through a turbulence nozzle 11. The end of the turbulence nozzle 11 is in the narrowest cross-section of front constriction 5, so that the fuel cone is in the range of the divergent section of the reaction chamber 4a where it is engaged by the rotary flow of the gaseous oxygen eddy and both propellant components mix rapidly and react with each other. This enhances the degree of burning and shortens the burning zone, and thus, the length of the combustion chamber. Reaction chamber 4a is cooled by the turbulent flow of portion W1, which flows protectively along the inside of the reaction chamber wall up to the central constriction 6 while evaporating.

Figure 3:
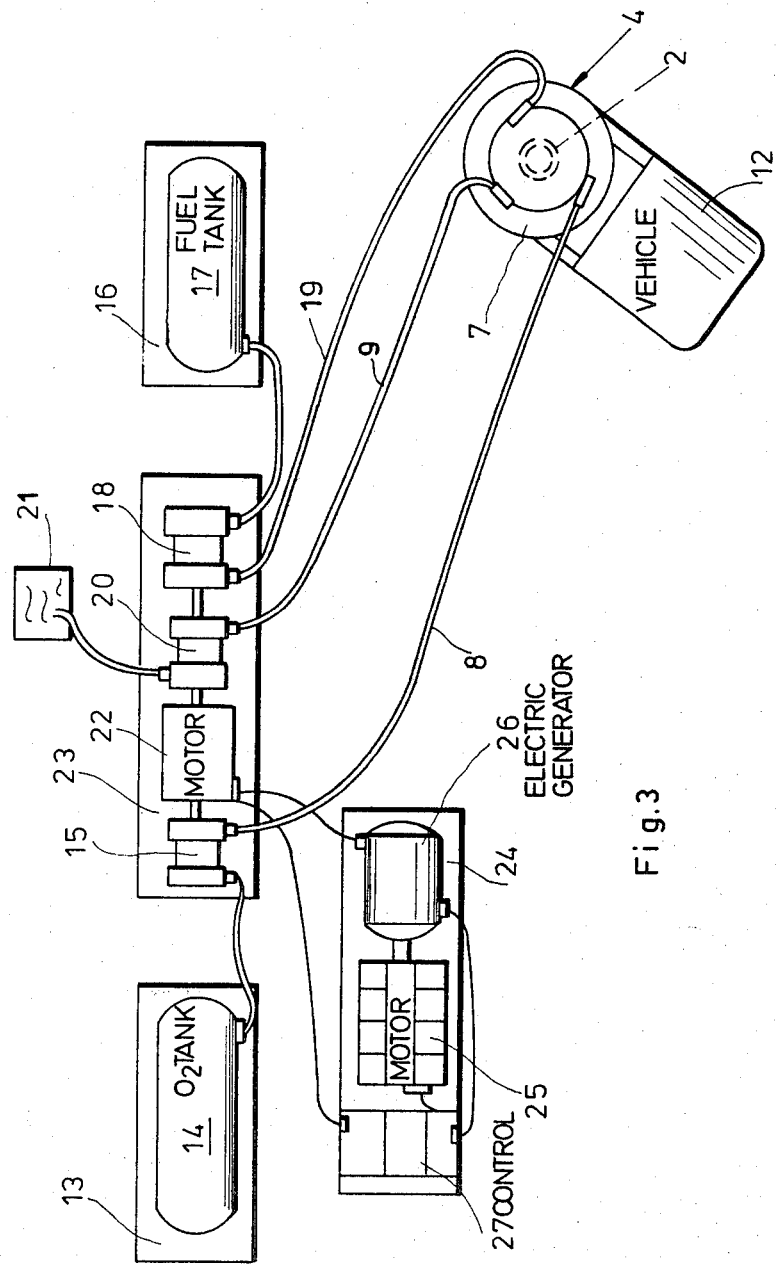
FIG. 3 is a schematic view of a mobile steam generating plant for extracting the crude oil in accordance with the invention.

As shown schematically in FIG. 3, combustion chamber 4 is installed in the rear of vehicle 12, from which the hot gases G generated therein flow into borehole 2. On a vehicle 13, an oxygen tank 14 is arranged from which oxygen (O) is delivered into turbulence chamber 7 by means of a pump 15 through line 8. Furthermore, a fuel tank 17 is provided on an additional vehicle 16, from which fuel is delivered to turbulent chamber 7 by means of a pump 18 through a line 19. A third pump 20 delivers water W through line 9 to combustion chamber 4 which is sucked in from a well 21. All three of the feed pumps 15, 18 and 20 are arranged together with an electric driving motor 22 on another vehicle 23. A fourth vehicle 24 serves to receive an internal combustion engine 25, an electric generator 26 driven by the latter and control means 27 are provided for the entire plant.

While a specific embodiment of the invention has been shown and described in detail to illustrate the application of the principles of the invention, it will be understood that the invention may be embodied otherwise without departing from such principles.

What is claimed is:

1. A device for extracting crude oil from previously tapped oil deposits having at least one feed bore extending thereto and at least one extraction bore extending therefrom, comprising, means defining a combustion chamber having at least one reaction chamber portion, an evaporation chamber portion and at least one constricted nozzle portion separating the reaction chamber and the evaporation chamber portion, means for introducing and burning a fuel and a chemical oxygen and/or an oxygen carrier in said reaction chamber portion to form high temperature combustion gases, means to introduce water into said reaction chamber to form superheated steam in the high temperature combustion gases and means for discharging the steam with the force of the gases from the reaction chamber through the feed bore and into the deposits to cause the oil therein to become less viscous and to flow out of the extraction bore, said means for introducing and burning a fuel and a chemical oxygen and/or an oxygen carrier comprising a separate means for introducing the fuel centrally into said combustion chamber and for introducing said oxygen tangentially into said combustion chamber and including means for directing the oxygen in liquid form along the walls of said evaporation chamber to cool said evaporation chamber and then directing it into said reaction chamber for burning therein.

2. A device for extracting crude oil from previously-tapped oil deposits having at least one feed bore extending thereto and at least one extraction bore extending therefrom, comprising, means defining a combustion chamber having a turbulence chamber portion, a reaction chamber portion and an evaporation chamber portion, a first constriction between said turbulence and reaction chamber portions, a second constriction between said reaction and evaporation chamber portions, means for introducing water and oxygen into said turbulence chamber for supplying water and oxygen past said first constriction in a turbulent state into said reaction chamber portion, means for supplying a fuel to said reaction chamber portion to be burned with oxygen therein to produce high temperature combustion gases which are supplied past said second constriction to said evaporation chamber whereby a cooling film of water is formed on interior surfaces of said reaction chamber portion which gradually evaporates cooling the reaction chamber portion, means for supplying additional water to said evaporation chamber portion to combine with said high temperature combustion gases, and means for discharging the high temperature combustion gases with the force of the gases from the reaction chamber through the feed bore and into the deposits to cause the oil therein to become less viscous and to flow out of the extraction bore.

3. A device as claimed in claim 2, including a vehicle mounting said device for positioning it in respect to the extraction bore, and means associated with said vehicle for supplying water and oxygen and fuel.

4. A device as claimed in claim 3, including a separate vehicle for oxygen and a separate vehicle for fuel and a separate vehicle for motor driven pump means connected to said oxygen and fuel for supplying it to said device.

5. A device as claimed in claim 2, wherein said means for supplying oxygen to said turbulence chamber portions includes means for passing liquid oxygen around said evaporation chamber portion to cool said evaporation chamber portion and warm the liquid oxygen.

6. A method of extracting crude oil from previously-tapped deposits of crude oil having at least one feed bore extending thereto and at least one extraction bore extending therefrom, comprising the steps of, supplying oxygen and water to a turbulence chamber for admixing the oxygen and water under turbulence, supplying the turbulently admixed oxygen and water to a reaction chamber with the supply of fuel to burn the fuel and oxygen to produce high temperature combustion gases, the water forming a cooling film in the reaction chamber which gradually evaporates to cool the reaction chamber, supplying the high temperature combustion gases through a constriction to an evaporation chamber, supplying additional water to the evaporation chamber which vaporizes in the high temperature combustion gases, and directing the high temperature combustion gases and evaporated water to the feed bore and into the deposit to cause the oil therein to become less viscous and to flow out of the extraction bore.

7. A method as claimed in claim 6, wherein the fuel and oxygen are directed into the combustion chamber after the oxygen is first used in a liquid state to cool a portion of the evaporation chamber.

* * * * *